US012802187B2

(12) United States Patent
Touze et al.

(10) Patent No.: US 12,802,187 B2
(45) Date of Patent: Nov. 17, 2026

(54) METHOD FOR PREVENTING CLIPPING IN SL-HDRX SYSTEMS

(71) Applicant: InterDigital Madison Patent Holdings, SAS, Paris (FR)

(72) Inventors: David Touze, Rennes (FR); Patrick Morvan, Laille (FR); Robin Le Naour, Cesson-Sevigne (FR); Frederic Plissonneau, Thorigne-Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 164 days.

(21) Appl. No.: 18/998,453

(22) PCT Filed: Jul. 24, 2023

(86) PCT No.: PCT/EP2023/070428
§ 371 (c)(1),
(2) Date: Jan. 24, 2025

(87) PCT Pub. No.: WO2024/023008
PCT Pub. Date: Feb. 1, 2024

(65) Prior Publication Data

US 2026/0010992 A1 Jan. 8, 2026

(30) Foreign Application Priority Data

Jul. 27, 2022 (EP) .................................... 22306116

(51) Int. Cl.
*G06T 5/92* (2024.01)
*H04N 1/60* (2006.01)
(Continued)

(52) U.S. Cl.
CPC ................ *G06T 5/92* (2024.01); *H04N 1/60* (2013.01); *H04N 19/186* (2014.11); *H04N 19/85* (2014.11); *G06T 2207/10024* (2013.01)

(58) Field of Classification Search
CPC ... G06T 5/92; G06T 2207/10024; H04N 1/60; H04N 19/186; H04N 19/85; H04N 19/46; H04N 9/641; H04N 9/642; H04N 9/64
See application file for complete search history.

(56) References Cited

U.S. PATENT DOCUMENTS 11,575,944 B2 * 2/2023 Andrivon .............. H04N 19/36
11,989,855 B2 * 5/2024 Cellier ..................... G06T 5/50
(Continued)

FOREIGN PATENT DOCUMENTS

EP 3220645 A1 9/2017
EP 3383017 A1 10/2018

OTHER PUBLICATIONS

"Infrastructure of audiovisual services—Coding of moving video—High Efficiency Video Coding", International Telecommunications Union (ITU), ITU-T Telecommunication Standardization Sector of ITU, Series H: Audiovisual and Multimedia Systems, Recommendation ITU-T H.265, Oct. 2014, 540 pages.
(Continued)

*Primary Examiner* — John B Strege
(74) *Attorney, Agent, or Firm* — Flaster Greenberg P.C.

(57) ABSTRACT

A method comprising emulating (401) an implementation of a post-processing process of an SL-HDRx system before applying a pre-processing process of the SL-HDRx system using input color components of a current sample of a current picture up to a computation of at least one intermediate chroma component; determining (402, 404) that a value of the at least one intermediate chroma component is higher than a maximum chroma component value depending on a calculation precision set in the implementation of the post-processing process; applying (403, 405) a correction process on the input color components to obtain corrected color components for the current sample respecting at least a clipping prevention condition responsive to the value of (Continued)

the at least one intermediate chroma component is higher than the maximum chroma component value.

17 Claims, 7 Drawing Sheets

(51) Int. Cl.
*H04N 19/186* (2014.01)
*H04N 19/85* (2014.01)

(56) References Cited

U.S. PATENT DOCUMENTS

2021/0266608 A1 8/2021 Andrivon et al.
2022/0392142 A1* 12/2022 Wolfe ........................ G06T 5/20
2024/0054773 A1* 2/2024 Mansata ................ G06V 10/82

OTHER PUBLICATIONS

"High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI Technical Specification, ETSI TS 103 433-2 V1.3.1, Aug. 23, 2021, 84 pages.
Rivaz et al., "AV1 Bitstream & Decoding Process Specification", The Alliance for Open Media, 2018, 661 pages.
"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.
ETSI Secretariat, "Final Draft—RTS/JTC-059-1 vl.3.7 (TS 103 433-1 ) SL-HDRI", ETSI Draft; BROADCAST(21) 000025, European Telecommunications Standards Institute(ETSI) vol. JTC Broadcas EBU/ CENELEC/ETSI on Broadcasting, No. 1.3.7, Jun. 22, 2021, 136 pages.
Lasserre et al., "Modulation-based HDR video coding with SDR backward compatibility", Joint Collaborative Team on Video Coding (JCT-VC) of ITU-T SG 16 WP 3 and ISO/IEC JTC 1/SC 29/WG 11, Document: JCTVC-U0085r1, 21st Meeting: Warsaw, PL, Jun. 15, 2015, 18 pages.
Grange et al., "VP9 Bitstream & Decoding Process Specification", Google, Inc., Version 0.6, Mar. 31, 2016, 171 pages.
"Advanced Video Coding for Generic Audiovisual Services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Jan. 2012, 680 pages.
"Information technology—General video coding—Part 1: Essential video coding", International Organization for Standardization (ISO), Coding of audio, picture, multimedia and hypermedia information, ISO/IEC JTC 1/SC 29, Document: ISO/IEC FDIS 23094-1, Oct. 2020, 351 pages.
"Guidance for operational practices in HDR television production", International Telecommunication Union, Radiocommunication Sector of ITU, BT Series, Broadcasting Service, Report ITU-R BT.2408-5, Mar. 2022, 79 pages.
"High-Performance Single Layer High Dynamic Range (HDR) System for use in Consumer Electronics devices; Part 1: Directly Standard Dynamic Range (SDR) Compatible HDR System (SL-HDR1)", European Broadcasting Union (EBU), European Telecommunication Standards Institute (ETSI), Technical Specification ETSI TS 103 433-1 v1.4.1, Aug. 2021, 136 pages.
"High-Performance Single Layer High Dynamic Range (HDR) System for use in Consumer Electronics devices; Part 3: Enhancements for hybrid log Gamma (HLG) transfer function based High Dynamic Range (HDR) Systems (SL-HDR3)", European Broadcasting Union (EBU), European Telecommunication Standards Institute (ETSI), Technical Specification ETSI TS 103 433-3 v1.2.1, Aug. 2021, 30 pages.

* cited by examiner

METHOD FOR PREVENTING CLIPPING IN SL-HDRX SYSTEMS

CROSS REFERENCE TO RELATED APPLICATIONS

This application is a U.S. National Stage Application under 35 U.S.C. § 371 of International Patent Application No. PCT/EP2023/070428, filed Jul. 24, 2023, which is incorporated herein by reference in its entirety.

This application claims priority to European Application No. 22306116.9, filed Jul. 27, 2022, which is incorporated herein by reference in its entirety.

1. TECHNICAL FIELD

At least one of the present embodiments generally relates to the field of production of High Dynamic Range (HDR) video and more particularly to a pre-processor-based method and device allowing preventing clipping in a post-processing process in a SL-HDRx system.

2. BACKGROUND

Recent advancements in display technologies are beginning to allow for an extended dynamic range of color, luminance and contrast in images to be displayed. The term image refers here to an image content that can be for example a video or a still picture or image.

High-dynamic-range video (HDR video) describes video having a dynamic range greater than that of standard-dynamic-range video (SDR video). HDR video involves capture, production, content/encoding, and display. HDR capture and display devices are capable of brighter whites and deeper blacks. To accommodate this, HDR encoding standards allow for a higher maximum luminance and use at least a 10-bit dynamic range (compared to 8-bit for non-professional and 10-bit for professional SDR video) in order to maintain precision across this extended range.

HDR production is a new domain and there will be a transition phase during which both HDR contents and SDR contents will coexist. During this coexistence phase, a same live content will be produced simultaneously in a HDR and a SDR version and distributed via a SDR/HDR distribution system to SDR and HDR capable devices. A user can then display the HDR or the SDR version of the content depending on his preferences or capabilities.

A SDR/HDR distribution system is composed of various modules comprising production systems, post production modules, pre-processor modules, encoding modules, decoding modules, post-processor modules and display modules. A production module could be for example, a HDR or SDR camera. A post-production module could be a module for color grading, insertion of special effects, tone mapping or inverse tone mapping. A pre-processor module could adapt a content to a SL-HDRx (x being 1, 2 or 3) standard for instance by generating a SDR or HDR video content with SL-HDRx metadata. The encoding module could encode the SDR or HDR video content and the SL-HDRx metadata into a video compression format such as HEVC or VVC. The decoding module decodes the encoded SDR or HDR video content and SL-HDRx metadata. The post-processor module could generate a SDR or a HDR picture of a video content, depending on the display capabilities, from a HDR (respectively SDR) picture and the SL-HDRx metadata. The display module is in charge of displaying the decoded SDR (respectively HDR) video or the generated HDR (respectively SDR) video. The SL-HDRx metadata represent tone mapping (TM) or inverse tone mapping (ITM) parameters and color correction (CC) or inverse color correction (ICC) parameters. One can note that TM (respectively ITM) parameters are representative of ITM (respectively TM) parameters and CC (respectively ICC) parameters are representative of ICC (respectively CC) parameters.

In System-On-Chips SL-HDRx systems, an integer implementation of the post-processor module is generally used. This integer implementation determines a bit-length of each internal signal or variable, thus fixing a calculation precision of the post-processor module. Depending on the implementation choices, some clipping may occur during the post-processing process which may provoke visible errors in the reconstructed video. Such errors are unacceptable and need to be corrected.

It is therefore desirable to overcome the above drawbacks.

It is particularly desirable to propose a SL-HDRx system that allows avoiding or limiting reconstruction errors due to clipping while preserving an artistic intent of an original source content.

3. BRIEF SUMMARY

In a first aspect, one or more of the present embodiments provide a method comprising:

- emulating an implementation of a post-processing process using input color components of a current sample of a current picture up to a computation of at least one intermediate chroma component, the post-processing process being comprised in a process for generating a picture in a first dynamic range from a picture in a second dynamic range and metadata representative of tone mapping parameters and color correction parameters;
- determining that a value of the at least one intermediate chroma component is higher than a maximum chroma component value depending on a calculation precision set in the implementation of the post-processing process;
- applying a correction process on the input color components to obtain corrected color components for the current sample respecting at least a clipping prevention condition and a hue preservation condition responsive to the value of the at least one intermediate chroma component is higher than the maximum chroma component value, the hue preservation condition allows obtaining a hue for the corrected color components equal to the hue of the input color components, the clipping prevention condition allows obtaining an intermediate chroma component value from a modified input color component lower than or equal to the maximum chroma component value;
- replacing the input color components of the current sample by the corrected color components; and,
- generating a picture representative of the current picture in the second dynamic range and the metadata wherein the generating comprises applying a pre-processing process on the current sample.

Thanks to this method, errors due to clipping a avoided or limited while preserving an artistic intent of an original source content In an embodiment, the correction process modifies the input color components to obtain corrected color components for the current sample respecting in addition a main component preservation condition, the main component preservation condition defines a range of admissible values for a corrected color component corresponding to the at least one intermediate chroma component higher than the maximum chroma component value around the value of an input color component corresponding to the same at least one intermediate chroma component higher than the maximum chroma component value.

In an embodiment, the hue preservation condition is respected when a ratio between an intermediate chroma component of a first chroma type and an intermediate chroma component of a second chroma type obtained from the modified color components is equal to a ratio between an intermediate chroma component of a first chroma type and an intermediate chroma component of a second chroma type obtained from the input color components.

In an embodiment, the range depends on a range factor, the range factor being fixed or depend on a peak luminance of a video content comprising the current picture or of the current picture.

In an embodiment, the range factor is the same for all intermediate chroma components or different for each intermediate chroma component.

In a second aspect, one or more of the present embodiments provide a device comprising electronic circuitry configured for:

- emulating an implementation of a post-processing process using input color components of a current sample of a current picture up to a computation of at least one intermediate chroma component, the post-processing process being comprised in a process for generating a picture in a first dynamic range from a picture in a second dynamic range and metadata representative of tone mapping parameters and color correction parameters;
- determining that a value of the at least one intermediate chroma component is higher than a maximum chroma component value depending on a calculation precision set in the implementation of the post-processing process;
- applying a correction process on the input color components to obtain corrected color components for the current sample respecting at least a clipping prevention condition and a hue preservation condition responsive to the value of the at least one intermediate chroma component is higher than the maximum chroma component value, the hue preservation condition allows obtaining a hue for the corrected color components equal to the hue of the input color components, the clipping prevention condition allows obtaining an intermediate chroma component value from a modified input color component lower than or equal to the maximum chroma component value;
- replacing the input color components of the current sample by the corrected color components; and,
- generating a picture representative of the current picture in the second dynamic range and the metadata wherein the generating comprises applying a pre-processing process on the current sample.

In an embodiment, the correction process modifies the input color components to obtain corrected color components for the current sample respecting in addition a main component preservation condition, the main component preservation condition defines a range of admissible values for a corrected color component corresponding to the at least one intermediate chroma component higher than the maximum chroma component value around the value of an input color component corresponding to the same at least one intermediate chroma component higher than the maximum chroma component value.

In an embodiment, the hue preservation condition is respected when a ratio between an intermediate chroma component of a first chroma type and an intermediate chroma component of a second chroma type obtained from the modified color components is equal to a ratio between an intermediate chroma component of the first chroma type and an intermediate chroma component of the second chroma type obtained from the input color components.

In an embodiment, the range depends on a range factor, the range factor being fixed or depend on a peak luminance of a video content comprising the current picture or depending on the current picture.

In an embodiment, the range factor is the same for all intermediate chroma components or different for each intermediate chroma component.

In a third aspect, one or more of the present embodiments provide a computer program comprising program code instructions for implementing the method according to the first aspect.

In a fourth aspect, one or more of the present embodiments provide a non-transitory information storage medium storing program code instructions for implementing the method according to the first aspect.

4. BRIEF SUMMARY OF THE DRAWINGS

5. DETAILED DESCRIPTION

Figure 1:
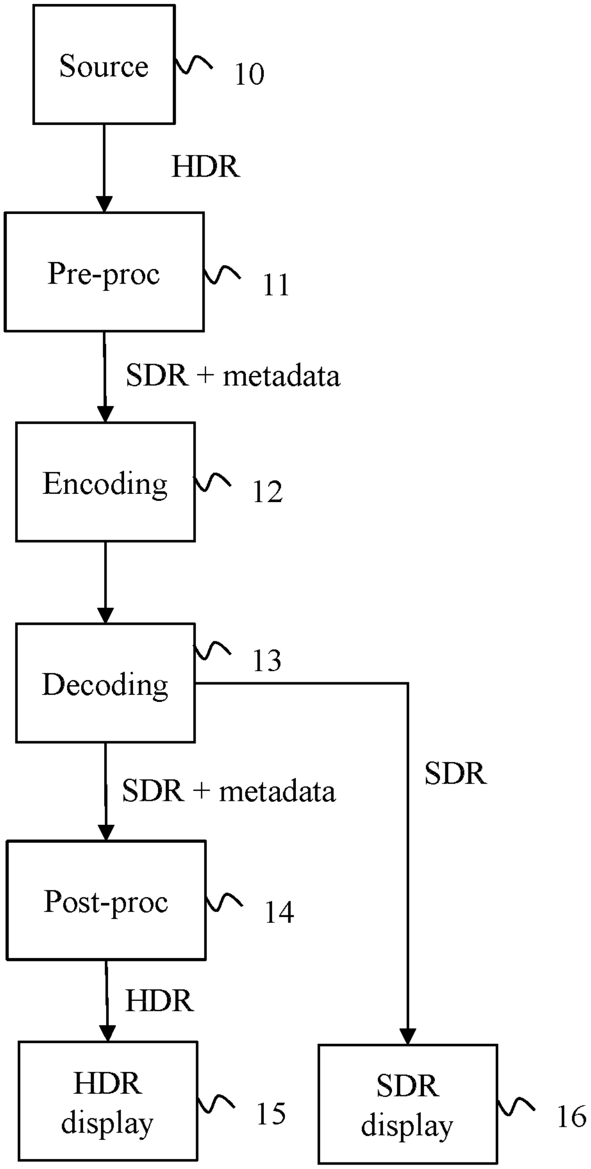
FIG. 1 illustrates schematically an example of context in which the various embodiments are implemented.

FIG. 1 illustrates schematically an example of context in which the various embodiments are implemented.

In FIG. 1, a source device 10, such as a camera or a streaming system providing a video content, generates a video content. The source device 10 is for instance a HDR camera generating a HDR video content.

The video content is then provided to a pre-processing module 11. The pre-processing module 11, for example, adapts a content to a SL-HDRx standard. For instance, the SL-HDRx standard is SL-HDR1. Therefore, the pre-processing module applies a tone mapping (TM) to the HDR video to generate a SDR video and generates SL-HDR1 metadata. The SL-HDR1 metadata comprise information representative of an inverse tone mapping function and of a color correction function allowing to obtain a SDR video or a HDR video, depending on the display capabilities, from a SDR video.

The SDR video and the SL-HDR1 metadata are then provided to an encoding module 12. The SDR video and the SL-HDR1 metadata are encoded by the encoding module in a bitstream using a video compression format such as AVC ((ISO/CEI 14496-10/ITU-T H.264), HEVC (ISO/IEC 23008—2-MPEG-H Part 2, High Efficiency Video Coding/ITU-T H.265)), VVC (ISO/IEC 23090—3-MPEG-I, Versatile Video Coding/ITU-T H.266), AV1,VP9, EVC (ISO/CEI 23094-1 Essential Video Coding) or any other video compression format adapted to encode a SDR video and SL-HDR1 metadata. The output of the encoding module 12 is a bitstream representing the encoded SDR video and the SL-HDR1 metadata.

The encoding module 12 then provides the bitstream to a decoding module 13 for instance via a network. The decoding module 13 decodes the bitstream to obtain a decoded version of the SDR video and the SL-HDR1 metadata.

The SDR video is provided directly to a display device 16 adapted to display SDR contents.

The SDR video and the SL-HDR1 metadata are also provided to a post-processor module 14. The post-processor module 14 applies an inverse tone mapping (ITM) and a color correction to the SDR video to obtain a SDR video or a HDR video depending on the display capabilities of the display device 15, using an ITM function and a color correction function derived from the SL-HDR1 metadata.

The SDR or HDR video is then provided to a display device 15 adapted to display SDR or HDR contents.

Figure 7A:
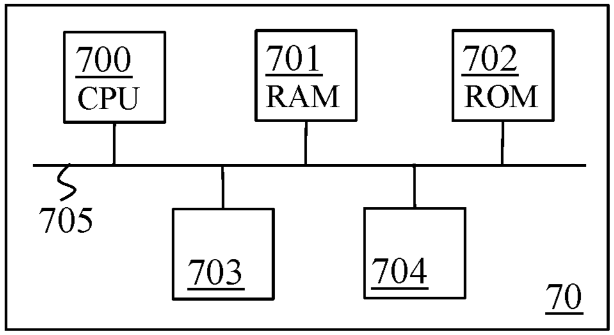
FIG. 7A illustrates schematically an example of hardware architecture of a processing module able to implement various aspects and embodiments.

FIG. 7A illustrates schematically an example of hardware architecture of a processing module 70 used for instance in the pre-processing module 11 or in the post-processor module 14. The processing module 70 comprises, connected by a communication bus 705: a processor or CPU (central processing unit) 700 encompassing one or more microprocessors, general purpose computers, special purpose computers, and processors based on a multi-core architecture, as non-limiting examples; a random access memory (RAM) 701; a read only memory (ROM) 702; a storage unit 703, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 704 for exchanging data with other modules, devices, systems or equipment. The communication interface 704 can include, but is not limited to, a transceiver configured to transmit and to receive data over a communication network 71. The communication interface 704 can include, but is not limited to, a modem or a network card.

For example, the communication interface 704 enables the processing module 70 to receive the HDR or SDR data and to output HDR or SDR data along with SL-HDR1 metadata.

The processor 700 is capable of executing instructions loaded into the RAM 701 from the ROM 702, from an external memory (not shown), from a storage medium, or from a communication network. When the processing module 70 is powered up, the processor 700 is capable of reading instructions from the RAM 701 and executing them. When the processing module 70 is comprised in the pre-processing module 11, these instructions form a computer program causing, for example, the implementation by the processor 700 of a pre-processing process comprising a process described in relation to FIGS. 4, 5 and 6.

All or some of the algorithms and steps of said processes may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit). One can note that a processor, a DSP, a microcontroller, a FPGA or an ASIC are various types of electronic circuitry.

Figure 7B:
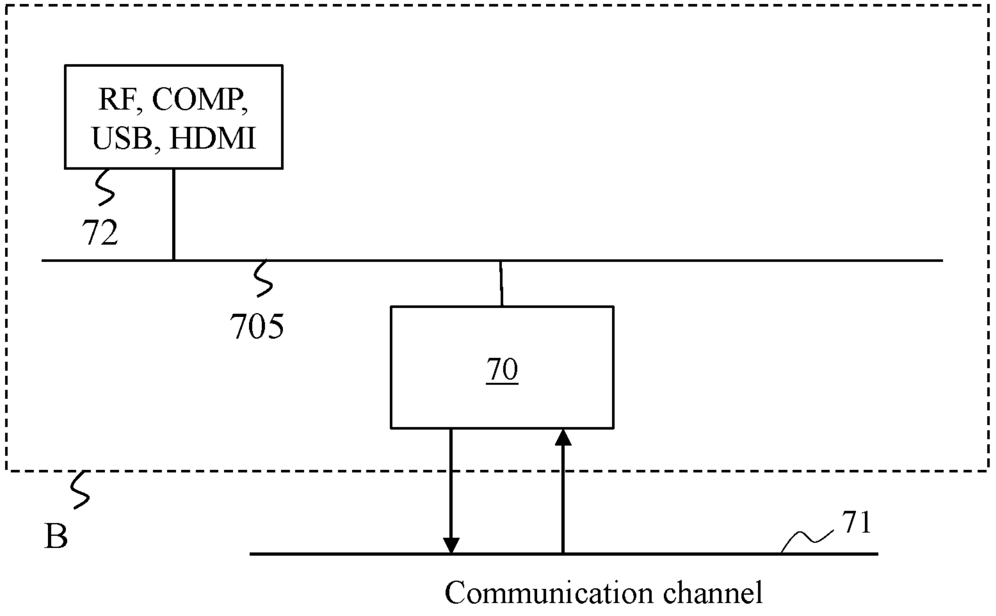
FIG. 7B illustrates a block diagram of an example of a first system in which various aspects and embodiments are implemented; and, FIG. 7C illustrates a block diagram of an example of a second system in which various aspects and embodiments are implemented.
Figure 7C:
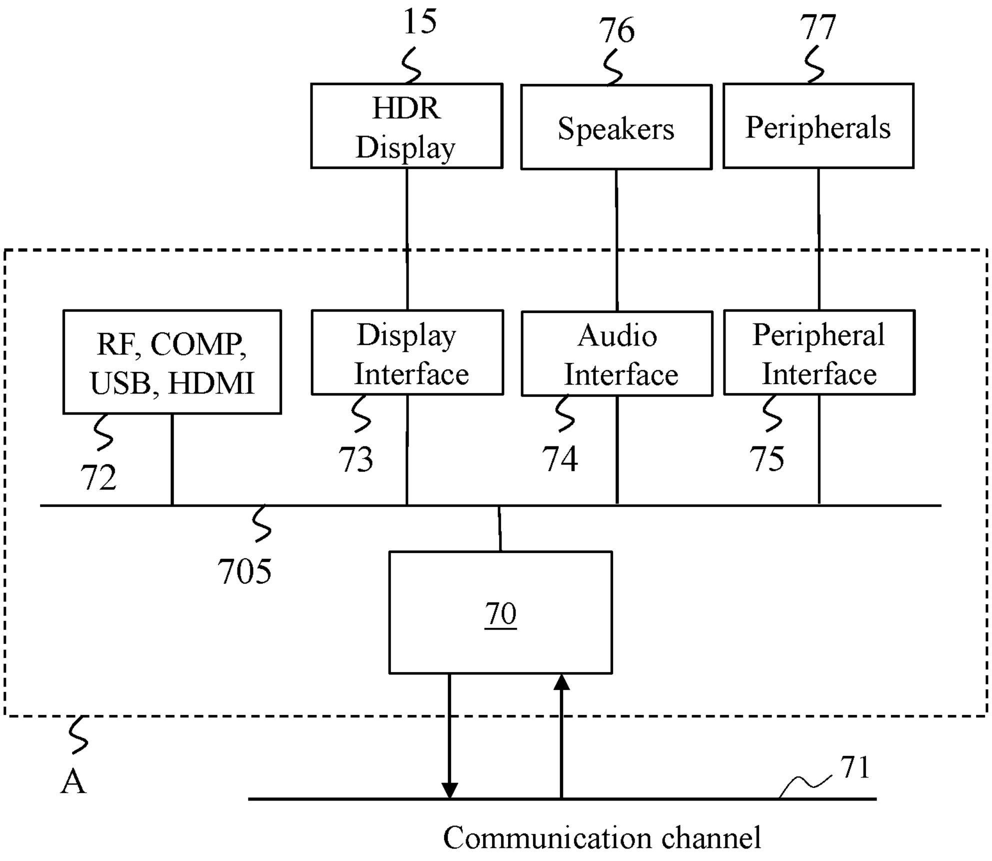

FIG. 7C illustrates a block diagram of an example of a system A implementing a post-processor module in which various aspects and embodiments are implemented.

System A can be embodied as a device including various components or modules and is configured to generate a HDR displayable video. Examples of such system include, but are not limited to, various electronic systems such as personal computers, laptop computers, smartphones, tablet, TV, or set top boxes. Components of system A, singly or in combination, can be embodied in a single integrated circuit (IC), multiple ICs, and/or discrete components. For example, in at least one embodiment, the system A comprises one processing module 70 that implements the post-processor module 14. In various embodiments, the system A is communicatively coupled to one or more other systems, or other electronic devices, via, for example, a communication bus or through dedicated input and/or output ports.

The input to the processing module 70 can be provided through various input modules as indicated in a block 72. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 7C, include composite video.

In various embodiments, the input modules of block 72 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system A to other electronic devices across USB and/or HDMI connections. It is to be understood that various aspects of input processing, for example, Reed-Solomon error correction, can be implemented, for example, within a separate input processing IC or within the processing module 70 as necessary. Similarly, aspects of USB or HDMI interface processing can be implemented within separate interface ICs or within the processing module 70 as necessary. The demodulated, error corrected, and demultiplexed stream is provided to the processing module 70.

Various elements of system A can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system A, the processing module 70 is interconnected to other elements of said system A by the bus 705.

The communication interface 704 of the processing module 70 allows the system A to communicate on the communication network 71. The communication network 71 can be implemented, for example, within a wired and/or a wireless medium.

Data is streamed, or otherwise provided, to the system A, in various embodiments, using a wireless network such as a Wi-Fi network, for example IEEE 802.11 (IEEE refers to the Institute of Electrical and Electronics Engineers). The Wi-Fi signal of these embodiments is received over the communications network 71 and the communications interface 704 which are adapted for Wi-Fi communications. The communications network 71 of these embodiments is typically connected to an access point or router that provides access to external networks including the Internet for allowing streaming applications and other over-the-top communications. Still other embodiments provide streamed data to the system A using the RF connection of the input block 72. As indicated above, various embodiments provide data in a non-streaming manner, for example, when the system A is a smartphone or a tablet. Additionally, various embodiments use wireless networks other than Wi-Fi, for example a cellular network or a Bluetooth network.

The system A can provide an output signal to various output devices using the communication network 71 or the bus 705. For example, the system A can provide a HDR video.

The system A can provide an output signal to various output devices, including the HDR display 15, speakers 76, and other peripheral devices 77. The HDR display 15 of various embodiments includes one or more of, for example, a touchscreen display, an organic light-emitting diode (OLED) display, a curved display, and/or a foldable display. The HDR display 15 can be for a television, a tablet, a laptop, a cell phone (mobile phone), or other devices. The HDR display 15 can also be integrated with other components (for example, as in a smart phone), or separate (for example, an external monitor for a laptop). The other peripheral devices 77 include, in various examples of embodiments, one or more of a stand-alone digital video disc (or digital versatile disc) (DVR, for both terms), a disk player, a stereo system, and/or a lighting system. Various embodiments use one or more peripheral devices 77 that provide a function based on the output of the system A. For example, a disk player performs the function of playing the output of the system A.

In various embodiments, control signals are communicated between the system A and the HDR display 15, speakers 76, or other peripheral devices 77 using signaling such as AV.Link, Consumer Electronics Control (CEC), or other communications protocols that enable device-to-device control with or without user intervention. The output devices can be communicatively coupled to system A via dedicated connections through respective interfaces 73, 74, and 75. Alternatively, the output devices can be connected to system A using the communication network 71 via the communication interface 704. The HDR display 15 and speakers 76 can be integrated in a single unit with the other components of system A in an electronic device such as, for example, a television. In various embodiments, the display interface 73 includes a display driver, such as, for example, a timing controller (T Con) chip.

The HDR display 15 and speakers 76 can alternatively be separate from one or more of the other components, for example, if the RF module of block 72 is part of a separate set-top box. In various embodiments in which the HDR display 15 and speakers 76 are external components, the output signal can be provided via dedicated output connections, including, for example, HDMI ports, USB ports, or COMP outputs.

FIG. 7B illustrates a block diagram of an example of the system B adapted to implement the pre-processing module 11 in which various aspects and embodiments are implemented.

System B can be embodied as a device including the various components and modules described above and is configured to perform one or more of the aspects and embodiments described in this document.

Examples of such devices include, but are not limited to, various electronic devices such as personal computers, laptop computers, a camera, a smartphone and a server. Elements or modules of system B, singly or in combination, can be embodied in a single integrated circuit (IC), multiple ICs, and/or discrete components. For example, in at least one embodiment, the system B comprises one processing module 70 that implement the pre-processing module 11. In various embodiments, the system B is communicatively coupled to one or more other systems, or other electronic devices, via, for example, a communications bus or through dedicated input and/or output ports.

The input to the processing module 70 can be provided through various input modules as indicated in block 72 already described in relation to FIG. 7C.

Various elements of system B can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system B, the processing module 70 is interconnected to other elements of said system B by the bus 705.

The communication interface 704 of the processing module 70 allows the system B to communicate on the communication network 71. The communication network 71 can be implemented, for example, within a wired and/or a wireless medium.

Data is streamed, or otherwise provided, to the system B, in various embodiments, using a wireless network such as a Wi-Fi network, for example IEEE 802.11 (IEEE refers to the Institute of Electrical and Electronics Engineers). The Wi-Fi signal of these embodiments is received over the communications network 71 and the communications interface 704 which are adapted for Wi-Fi communications. The communications network 71 of these embodiments is typically connected to an access point or router that provides access to external networks including the Internet for allowing streaming applications and other over-the-top communications. Still other embodiments provide streamed data to the system B using the RF connection of the input block 72. As indicated above, various embodiments provide data in a non-streaming manner.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), smartphones, tablets, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry a SDR image or video sequence and SL-HDRx metadata of a described embodiment. Such a signal can be formatted, for example, as an electromagnetic wave (for example, using a radio frequency portion of spectrum) or as a baseband signal. The formatting can include, for example, encoding a SDR image or video sequence with SL-HDR1 metadata in an encoded stream and modulating a carrier with the encoded stream. The information that the signal carries can be, for example, analog or digital information. The signal can be transmitted over a variety of different wired or wireless links, as is known. The signal can be stored on a processor-readable medium.

Figure 2A:
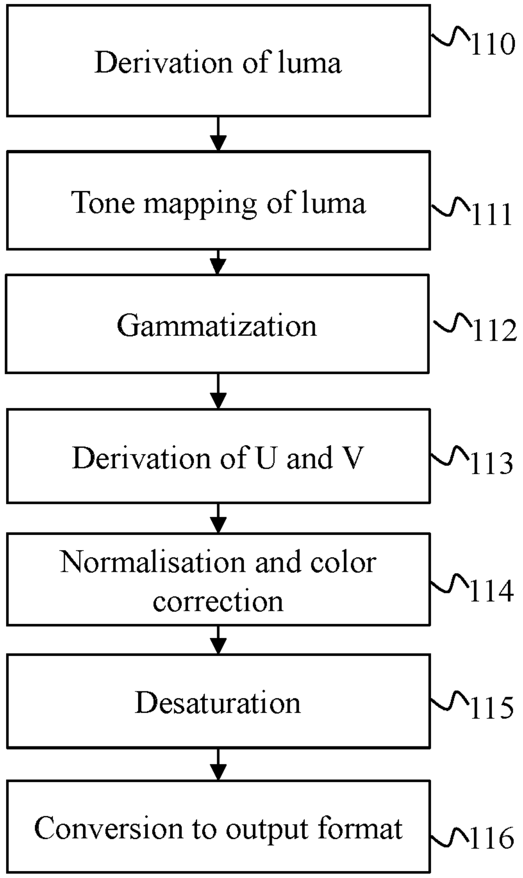
FIG. 2A illustrates a pre-processing process adapted to SL-HDR1 mode.

FIG. 2A illustrates a pre-processing process adapted to SL-HDR1.

The pre-processing process of FIG. 2A is for instance executed by the processing module 70 of the system B when this module implements the pre-processing module 11. This process is applied to all samples of pictures of the video content.

In a step 110, the processing module 70 derives a luma component L' from linear RGB components of a current sample of a picture of the video content as follows:

$$L' = A_1 \begin{bmatrix} R^{\frac{1}{\gamma}} \\ G^{\frac{1}{\gamma}} \\ B^{\frac{1}{\gamma}} \end{bmatrix} \quad \text{(eq. 1)}$$

In a step 111, the processing module 70 applies a tone mapping to the luma component L' using a Look-up table $LUT_{TM}$ as follows:

$$Y_{pre0} = LUT_{TM}(L') \quad \text{(eq. 2)}$$

Where $Y_{pre0}$ is a tone mapped luma component with $Y_{pre0}$ in [0,1023].

In a step 112, the processing module applies a gammatization to the linear RGB components of the current sample:

$$\begin{bmatrix} R_S \\ G_S \\ B_S \end{bmatrix} = \begin{bmatrix} R^{\frac{1}{\gamma}} \\ G^{\frac{1}{\gamma}} \\ B^{\frac{1}{\gamma}} \end{bmatrix} \quad \text{(eq. 3)}$$

with γ=2.4.

In a step 113, the processing module 70 derives U and V components from the gammatized RGB components:

$$\begin{bmatrix} U_{pre0} \\ V_{pre0} \end{bmatrix} = \begin{bmatrix} A_2 \\ A_3 \end{bmatrix} \begin{bmatrix} R_S \\ G_S \\ B_S \end{bmatrix} * 1024 \quad \text{(eq. 4)}$$

In a step 114, the processing module 70 applies a joint signal normalization and color correction to the derived U and V components:

$$\begin{bmatrix} U_{pre1} \\ V_{pre1} \end{bmatrix} = \frac{1}{\beta_0(Y_{pre0})} \cdot \begin{bmatrix} U_{pre0} \\ V_{pre0} \end{bmatrix} \quad \text{(eq. 5)}$$

$U_{pre1}$ and $V_{pre1}$ being clipped between [−512,511].

In a step 115, the processing module 70 applies a desaturation to the luma component $Y_{pre1}$ $$Y_{pre1} = Y_{pre0} - \max(0, a.U_{pre1} + b.V_{pre1}) \quad \text{(eq. 6)}$$

Where a and b are parameters described in table A.1 and section 6.2.2 of the standard SL-HDR1 (ETSI TS 103 433-1 V1.4.1, High-Performance Single Layer High Dynamic Range (HDR) System for use in Consumer Electronics devices; Part 1: Directly Standard Dynamic Range (SDR) Compatible HDR System (SL-HDR1)).

In a step 116, the processing module 70 converts the components $Y_{pre1}$, $U_{pre1}$ and $V_{pre1}$ into an output format. To do so, a value "512" is added to $U_{pre1}$ and $V_{pre1}$.

Then, once all samples of a picture are processed, the chroma components could be down-sampled depending on the chroma format and a conversion of samples of the picture from full to standard range is performed to obtain a picture of SDR samples $Y_{sdr}U_{sdr}V_{sdr}$.

The SL-HDR2 pre-processing is simpler and comprises two steps. Again this process is applied to all samples of a picture of the video content.

In a first step, the processing module 70 derives components $Y_{pre0}$, $U_{pre0}$ and $V_{pre0}$ of a PQ signal from linear RGB components as follows:

$$\begin{bmatrix} Y_{pre0} \\ U_{pre0} \\ V_{pre0} \end{bmatrix} = A_1 \begin{bmatrix} R'' \\ G'' \\ B'' \end{bmatrix} \quad \text{(eq. 7)}$$

With R"=PQ_OETF(R), G"=PQ_OETF(G) and B"=PQ_OETF(B). For SL-HDR3, an additional conversion step from PQ to HLG is added, prior to the next step (i.e. the second step described below):

$(R_{HLG}, G_{HLG}, B_{HLG})$=PQ_to_HLG (R", G", B"), as detailed in section 6 of document ITU-R BT.2408-5.

In a second step, the processing module 70 converts the components $Y_{pre0}$, $U_{pre0}$ and $V_{pre0}$ into an output format. To do so, a value "512" is added to $U_{pre0}$ and $V_{pre0}$. Then, once all samples of a picture are processed, the chroma components could be down-sampled depending on the chroma format and a conversion of samples of the picture from full to standard range is performed to obtain a picture of HDR samples $Y_{hdr}U_{hdr}V_{hdr}$.

Figure 2B:
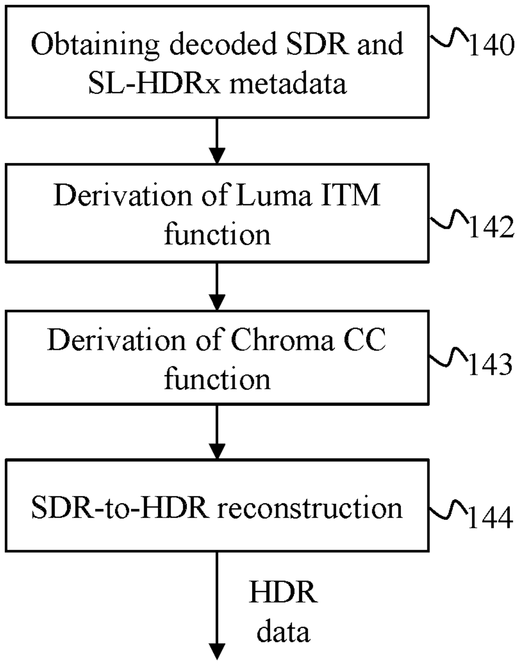
FIG. 2B illustrates a post-processing process allowing generating a HDR picture from a SDR picture.

FIG. 2B illustrates a post-processing process allowing generating a HDR picture from a SDR picture.

The post-processing process described in FIG. 2B is a summary of the post-processing process described in section 7.2.4 of the standard SL-HDR1 (ETSI TS 103 433-1 V1.4.1, High-Performance Single Layer High Dynamic Range (HDR) System for use in Consumer Electronics devices; Part 1: Directly Standard Dynamic Range (SDR) Compatible HDR System (SL-HDR1)).

The post-processing process of FIG. 2B is for instance executed by the processing module 70 of the system A when this module implements the post-processor module 14.

In a step 140, the processing module 70 obtains a decoded SDR video and SL-HDR1 metadata. In that case, the system A has received an encoded video stream comprising the SDR video and the SL-HDR1 metadata and has decoded this video stream using a decoding module such as the decoding module 13.

In a step 142, the processing module 70 derives an ITM function to be applied to a luma (i.e. luminance) component of the SDR video from the SL-HDR1 metadata. During step 142, the process described in section 7.2.3.1 of the SL-HDR1 specification is applied.

In a step 143, the processing module 70 derives a color correction function to be applied to chroma (i.e. chrominance) components of the SDR video from the SL-HDR1 metadata. During step 143, the process described in section 7.2.3.2 of the SL-HDR1 specification is applied.

In a step 144, the processing module 70 reconstructs a SDR video or a HDR video depending on the capabilities of the display from the SDR video and the SL-HDR1 metadata. During step 144, the process described in section 7.2.4 of the SL-HDR1 specification is applied. An example of implementation of step 144 in the case of SL-HDR1 is detailed in relation to FIG. 3.

The post-processing process applied for SL-HDR2 and SL-HDR3 is similar. In that case, in step 140, the processing module 70 obtains a decoded HDR video and SL-HDR2 or SL-HDR3 metadata. In step 144, the processing module 70 reconstructs a SDR video or a HDR video depending on the capabilities of the display from the HDR video and the SL-HDR2 or SL-HDR3 metadata.

Figure 3:
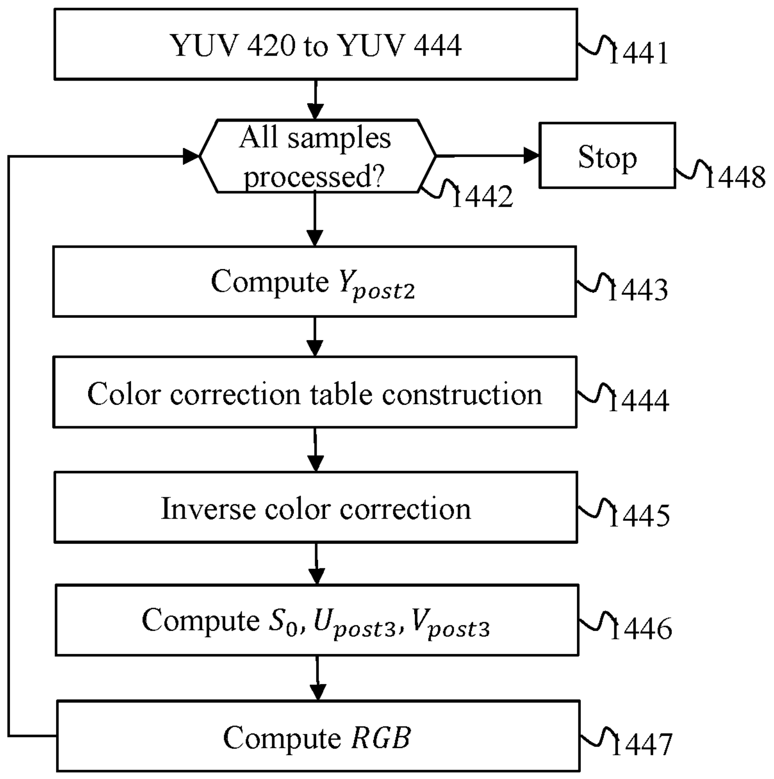
FIG. 3 illustrates a SDR to HDR reconstruction process.

FIG. 3 illustrates a SDR to HDR reconstruction process

In general, the decoded SDR video is represented in YUV 420 format with a limited range while the internal calculations in the post-processor module are performed in YUV 444 format with a full range. A limited range means that a range of possible values defined by the bit-depth (8 bits, 10 bits, 12 bits, etc) is not fully occupied. An example of a typical limited range for a bit-depth of 10 bits for a Y (respectively for a U or V) component is [64;940] (respectively [64; 960]) while the full range allowed by the 10 bits is [0; 1023].

The process of FIG. 3 is executed for each picture of the SDR video, called SDR picture in the following.

In a step 1441, the processing module 70 converts a current SDR picture in a converted picture in YUV 444 format with a full range. To do so, the processing module 70 starts by up-sampling the chroma components of the input SDR picture to obtain a SDR picture in YUV 444 format. Then, each component of each sample of the picture in YUV 444 format is converted from the limited range to the full range, for example, by applying the following process:

$$Y_{in} = (Y_{in\_lr} - 64)/876 \times 1023$$

$$U_{in} = (U_{in\_lr} - 512)/896 \times 1023 + 512$$

$$V_{in} = (V_{in\_lr} - 512)/896 \times 1023 + 512$$

where $Y_{in\_lr}$, $U_{in\_lr}$ and $V_{in\_lr}$ are the three components of a sample of the SDR picture in YUV 444 format and $Y_{in}$, $U_{in}$ and $V_{in}$ are three components of a corresponding sample of the converted picture. In other words, the processing module 70 converts the components representative of the samples (i.e. the Y, U and V components) of the SDR picture in YUV 444 format from a first range (i.e. the limited range) to a second range (i.e. the full range), the second range being larger than the first range. During step 1441, the processing module 70 centers the obtained chroma components $U_{in}$ and $V_{in}$ using equation (25) of section 7.2.4 of the SL-HDR1 specification to obtain centered components $U_{post1}$ and $V_{post1}$:

$$\begin{cases} U_{post1} = U_{in} - midSampleVal \\ V_{post1} = V_{in} - midSampleVal \end{cases}$$

where the value midSampleVal is defined in the SL-HDR1 specification ("512" for "10" bits components).

One can note that the current SDR picture could be in another format such as the format YUV 444. In that last case, no up-sampling of the chroma components is required.

In a step 1442, the processing module 70 determines if all samples of the converted picture have been processed. If at least one sample of the converted picture remains to be processed, step 1442 is followed by steps 1443 to 1447. Steps 1443 to 1447 are applied to one sample of the converted picture, called current sample in the following.

In step 1443, the processing module 70 computes a luma component $Y_{post2}$. To do so, the processing module first applies a re-saturation to the luma component $Y_{in}$ of the current sample using equation (26) specified in section 7.2.4 of the SL-HDR1 specification to obtain a re-saturated luma component $Y_{post1}$:

$$Y_{post1} = Y_{in} + \mathrm{Max}(0; mu_0 \times U_{post1} + mu_1 \times V_{post1})$$

The re-saturated component $Y_{post1}$ is then clamped in the range [0; 1023] using equation (eq. 27) of section 7.2.4 of the SL-HDR1 specification to obtain the luma component value $Y_{post2}$.

$$Y_{post2} = Clip3(0; maxSampleVal - 1; Y_{post1})$$

In a step 1444, the processing module 70 computes a color correction function using SL-HDR1 metadata. The computation of the color correction function amounts in constructing a color correction look-up table lutCC[ ]. The construction of the look-up table lutCC[ ] use equation (eq. 21) and (eq. 22) of section 7.2.3.2 of the SL-HDR1 specification as follows:

$$lutCC[0] = 0,125$$

$$lutCC[Y] = \mathrm{Min}\left(lutCC[0];\ \frac{1}{\mathrm{Max}(R_{sgf}/255;\ R_{sgf} \times g(Y_n))} - L(Y_n)\right)$$

where $$Y_n = \frac{Y}{maxSampleVal - 1},$$

and g( ), L( ) and $R_{sgf}$ being defined in the SL-HDR1 where specification.

In a step 1445, the processing module 70 applies an inverse color correction to the chroma components $U_{post1}$ and $V_{post1}$ using the look-up table lutCC[ ]. To do so, the processing module 70 applies equation (28) of section 7.2.4:

$$\begin{cases} U_{post2} = lutCC[Y_{post2}] \times U_{post1} \\ V_{post2} = lutCC[Y_{post2}] \times V_{post1} \end{cases}$$

In a step 1446, the processing module 70 computes components $S_0$, $U_{post3}$, $V_{post3}$. Components $S_0$, $U_{post3}$ and $V_{post3}$ are computed using equations (eq. 29) and (eq. 30) specified in section 7.2.4 of the SL-HDR1 specification as follows:

$S_0$ is initialized to zero.

$$T = k_0 \times U_{post2} \times V_{post2} + k_1 \times U_{post2} \times U_{post2} + k_2 \times V_{post2} \times V_{post2}$$

$$\text{If } (T \le 1),\ S_0 = \sqrt{1 - T},\ U_{post3} = U_{post2} \text{ and } V_{post3} = V_{post2}$$

Otherwise (T>1), $U_{post3}$ and $V_{post3}$ are derived from $U_{post2}$ and $V_{post2}$ as follows:

$$\begin{cases} U_{post3} = \dfrac{U_{post2}}{\sqrt{T}} \\ V_{post3} = \dfrac{V_{post2}}{\sqrt{T}} \end{cases}$$

In a particular case of SL-HDR1 where $k_0=k_1=k_2=0$, $S_0$, $U_{post3}$, $V_{post3}$ are defined as follows:

$$S_0 = 1$$

$$U_{post3} = U_{post2}$$

$$V_{post3} = V_{post2}$$

In most of the cases, these equations are sufficient to reconstruct accurately a HDR video. However, some errors may occur in some particular cases. For example, the integer implementation of the post-processor module 14 in SL-HDR1 could use a bit-length of 14 bits+1 bit for sign for an internal representation of the intermediate chroma components $U_{post2}$ and $V_{post2}$ while a bit-length of 9 bits+1 bit for sign is used for a representation of the intermediate chroma components $U_{post3}$ and $V_{post3}$.

In this integer implementation and for some very saturated red and blue colors in the SDR video (provided, for instance, by the pre-processor 11), $U_{post2}$ and/or $V_{post2}$ could have an absolute value higher than 9 bits. In that case, the conversion from $U_{post2}/V_{post2}$ on 14 bits+1 bit for sign to $U_{post3}/V_{post3}$ on 9 bits+1 bit for sign implies clipping when $U_{post2}/V_{post2}$ has an absolute value higher than 29=512. Such clipping is at the origin of errors in the reconstructed HDR image.

In a step 1447, the processing module 70 derives RGB components of a sample of a HDR picture corresponding to the current sample from the values $S_0$, $U_{post3}$ and $V_{post3}$ using equations (eq. 31), (eq. 32) and (eq. 33) of section 7.2.4 of the SL-HDR1 specification.

When all samples of the converted picture have been processed in step 1442, the processing module stops the computation of the HDR picture in a step 1448.

One can note that FIG. 3 illustrates an example in the context of SL-HDR1 mode. However, a similar clipping issue exist for SL-HDR2 and SL-HDR3 where $k_0=k_1=k_2=0$ as in SL-HDR1 mode.

It could be also noted that for SL-HDR1:

$Y_{pre0}$ corresponds to $Y_{post2}$;

$U_{pre1}$ and $V_{pre1}$ correspond to Uposti and Vpostl;

$$\beta_0(Y_{pre0}) = lutCC[Y_{post2}]\cdot(invLUT[Y_{post2}])^{\frac{1}{\gamma}}\cdot 1024 \text{ with } \gamma = 2.4. \quad \text{(eq. 8)}$$

$$\text{And as } (invLUT[Y_{post2}])^{\frac{1}{\gamma}} = L',$$

$$\beta_0(Y_{pre0}) = lutCC[Y_{post2}]\cdot L'\cdot 1024.$$

Figure 4:
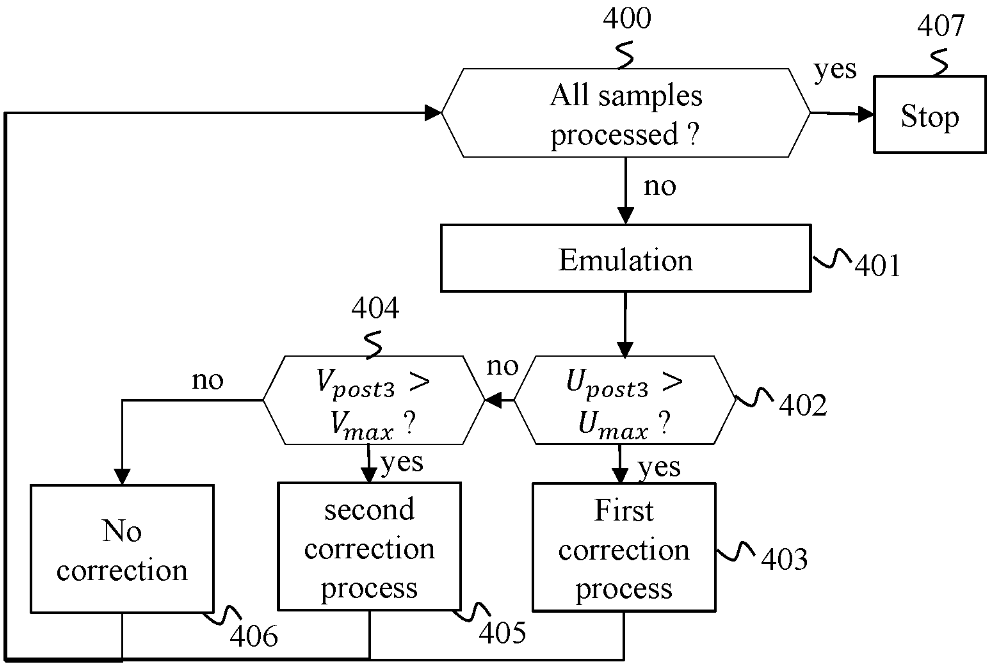
FIG. 4 illustrates an example of a process allowing limiting the risk of clipping at the post-processing process level.

For SL-HDR2 (and SIIHDR3):

$Y_{pre0}$ corresponds to $Y_{post2}$;

$U_{pre0}$ and $V_{pre0}$ correspond to $U_{post1}$ and $V_{post1}$;

FIG. 4 illustrates an example of a process allowing limiting the risk of clipping at the post-processing process level.

The solution proposed in FIG. 4 is based on the fact that, for very saturated blue colors (pixels with very high B component and very low R and G components), modifying the values of R, G and B components in a given range that preserves the hue does not perceptually affect the rendered color on a display, i.e. the color approximately respects the artistic intent of the original HDR source content. This property is the same for very saturated red colors (pixels with very high R component and very low B and G components) when modifying the values of R, G and B components in a given range that preserves the hue.

The proposed solution consists in emulating, in the pre-processor, the integer implementation of the post-processing reconstruction up to the computation of the intermediate chroma components $U_{post3}$ and $V_{post3}$. At that point, for each sample of a picture of the video content, the solution comprises checking if $U_{post3}$ (respectively $V_{post3}$) value is higher than a maximum chroma component value of the same chroma type (the chroma type is U for $U_{post3}$ and V for $V_{post3}$) depending on a calculation precision set in the post-processor module integer implementation and, if this is the case, to modify the sample in such a way that the risk of clipping disappears, as explained below. The calculation precision depends on the bit-length of internal intermediate variables used in the post-processing process. Taking the example of the integer implementation of the post-processor module in SL-HDR1 mode using a bit-length of 14 bits+1 bit for sign for an internal representation of chroma components $U_{post2}$ and $V_{post2}$ and a bit-length of 9 bits+1 bit for sign for a representation of the chroma components $U_{post3}$ and $V_{post3}$, the calculation precision depends on the variable having the shortest bit-length (here $U_{post3}$ and $V_{post3}$) and the maximum chroma component value equals to "$2^9-1=511$".

Responsive to the computed component $U_{post3}$ value is higher than a maximum U value depending on the maximum precision, this means that the B (blue) component value of the source pixel is very high compared to the two other components R (red) and G (green). In that case, the three RGB components of the sample are modified in such a way that the hue (a characteristic of the color that depends on the RGB components) is preserved, that the perception of the luminance is not affected and that the new computed component $U_{post3}$ value is equal to the maximum U value depending of the maximum precision. The new computed RGB components replace the RGB components of the sample of the picture of the video content, leading to a global modification of the pixel that is not (or very slightly) visible on a display. The same principle also applies if the computed component $V_{post3}$ value is higher than a maximum V value depending on the maximum precision.

Doing that solves the clipping issue mentioned above and ensures that the modified HDR content is perceptually very close to the original HDR source content, and therefore that the derived SDR content produced by an SL-HDR1 pre-processor or any SDR to HDR content produced by an SL-HDRx post-processor when applying Display Adaptation preserve the hue and therefore the artistic intent of the original HDR source content.

The process of FIG. 4 is executed by the processing module 70 of the pre-processing module 11. The process of FIG. 4 is executed for example during the pre-processing process adapted to SL-HDR1 mode described in FIG. 2A before step 110. The process of FIG. 4 could also be executed in the contexts of SL-HDR2 and SL-HDR3 as a preliminary step before the first pre-processing step.

In a step 400, the processing module 70 determines if all samples of a current picture of the video content are processed. If yes, the process stops in a step 407. Step 407 is for example followed by step 110 described in relation to FIG. 2A.

In a step 401, the processing module 70 emulates the integer implementation of the post-processing reconstruction process using the RGB components of a current sample of the current picture up to the computation of the intermediate chroma components $U_{post3}$ and $V_{post3}$.

Figure 5:
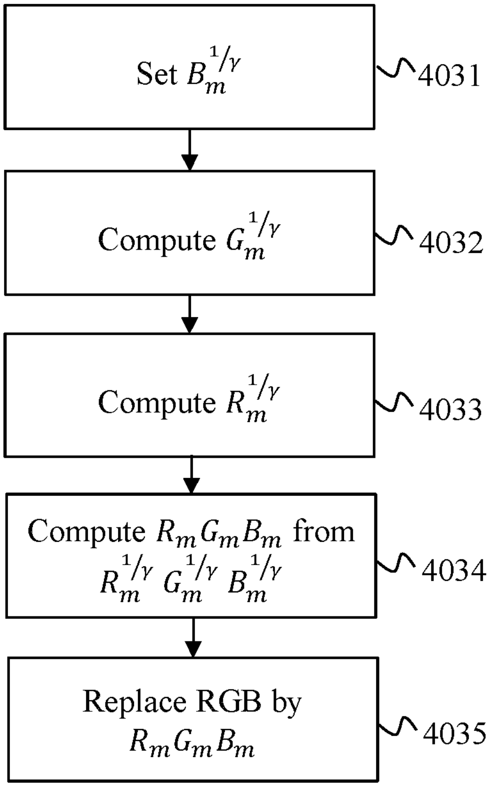
FIG. 5 illustrates an example of a first correction process.

In a step 402, the processing module 70 compares a value of a first intermediate chroma component to a maximum chroma component value of the same chroma type depending on a calculation precision set in the post-processing process integer implementation. For example, the first intermediate chroma component is $U_{post3}$ and the maximum chroma component value of the same chroma type is $U_{max}$. If the value of a first intermediate chroma component is higher than the maximum chroma component value (if $U_{post3}>U_{max}$) a first correction process described in relation to FIG. 5 is applied in a step 403. Otherwise (if $U_{post3}\leq U_{max}$), step 402 is followed by a step 404.

Figure 6:
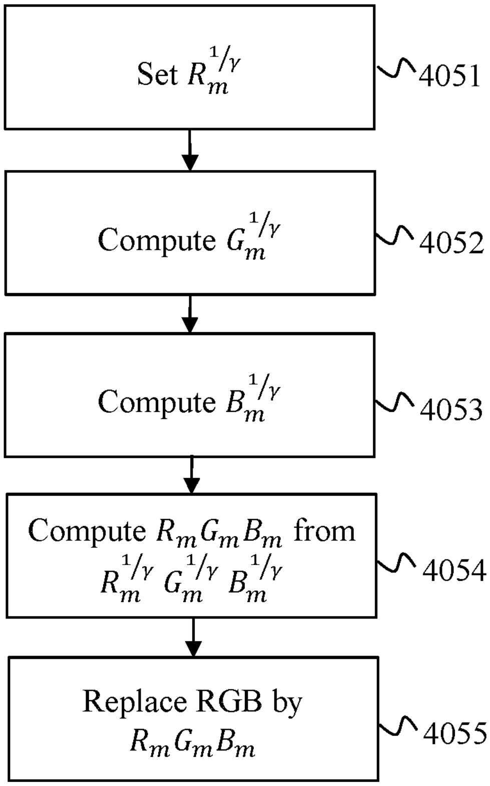
FIG. 6 illustrates an example of a second correction process.

In step 404, the processing module 70 compares a value of a second intermediate chroma component to a maximum chroma component value of the same chroma type depending on the calculation precision set in the post-processor module integer implementation. Following the same example, the second intermediate chroma component is $V_{post3}$ and the maximum chroma component value of the same chroma type is $V_{max}$. If the value of a second intermediate chroma component is higher than the maximum chroma component value (if $V_{post3}>V_{max}$) a second correction process described in relation to FIG. 6 is applied in a step 405. Otherwise (if $V_{post3}\leq V_{max}$), step 404 is followed by a step 406. During step 406, no correction is applied to the RGB components of the current sample of the current picture.

Steps 403, 405 and 406 are followed by step 400.

As can be seen in FIG. 4, the processing module 70 determines in steps 402 and 404 if a value of at least one intermediate chroma component is higher than a maximum chroma component value of the same chroma type depending on the calculation precision set in the post-processing process integer implementation and applies a correction process in steps 403 and 405 responsive to the value of the at least one intermediate chroma component is higher than the maximum chroma component value of the same chroma type.

In a first variant of the process of FIG. 4, the first intermediate chroma component is $V_{post3}$ and the maximum chroma component value of the same chroma type is $V_{max}$ and the second intermediate chroma component is $U_{post3}$ and the maximum chroma component value of the same chroma type is $U_{max}$.

In a second variant of the process of FIG. 4, instead of determining sequentially if the first intermediate chroma component is higher than the maximum chroma component value of the same chroma type and then if the second intermediate chroma component is higher than the maximum chroma component value of the same chroma type, the two intermediate chroma components are compared to the maximum chroma component value of the same chroma type simultaneously. If only the first intermediate chroma component is higher than the maximum chroma component value of the same chroma type, the first correction process is selected. If only the second intermediate chroma component is higher than the maximum chroma component value of the same chroma type, the second correction process is selected. If both the first and the second intermediate chroma components are higher than their respective maximum chroma component value of the same chroma type, the post-processing module 70 selects the correction process corresponding to the highest intermediate chroma component. In that case if the first intermediate chroma component is higher than the second intermediate chroma component, the first correction process is selected. If the second intermediate chroma component is higher than the first intermediate chroma component, the second correction process is selected. It is supposed here that the highest intermediate chroma component has the most impact on the reconstructed picture.

In the case of SL-HR1 mode with $k_0=k_1=k_2=0$, as already mentioned above, the SL-HDR1 pre-processor needs to emulate the post-processing reconstruction process up to the intermediate chroma components $U_{post3}$ and $V_{post3}$ reconstruction. As $U_{post3}=U_{post2}$ and $V_{post3}=V_{post2}$, this leads to:

$$U_{post3} = lutCC[Y_{post2}] \times U_{post1};\ V_{post3} = lutCC[Y_{post2}] \times V_{post1} \quad \text{(eq. 9)}$$

Using equations (eq. 5), (eq. 8) and (eq. 9), one can obtain:

$$\begin{bmatrix} U_{post3} \\ V_{post3} \end{bmatrix} = \frac{\beta_0(Y_{pre0})}{L' \cdot 1024} \cdot \begin{bmatrix} U_{pre1} \\ V_{pre1} \end{bmatrix} = \frac{\beta_0(Y_{pre0})}{L' \cdot 1024} \cdot \frac{1024}{\beta_0(Y_{pre0})} \cdot \begin{bmatrix} A_2 \\ A_3 \end{bmatrix} \begin{bmatrix} R^{\frac{1}{\gamma}} \\ G^{\frac{1}{\gamma}} \\ B^{\frac{1}{\gamma}} \end{bmatrix}$$

and then:

$$\begin{bmatrix} U_{post3} \\ V_{post3} \end{bmatrix} = \frac{1}{L'} \cdot \begin{bmatrix} A_2 \\ A_3 \end{bmatrix} \begin{bmatrix} R^{\frac{1}{\gamma}} \\ G^{\frac{1}{\gamma}} \\ B^{\frac{1}{\gamma}} \end{bmatrix} \text{ with } L' = A_1 \begin{bmatrix} R^{\frac{1}{\gamma}} \\ G^{\frac{1}{\gamma}} \\ B^{\frac{1}{\gamma}} \end{bmatrix} \quad \text{(eq. 10)}$$

In other words:

$$U_{post3} = \frac{A_{21} \cdot R^{\frac{1}{\gamma}} + A_{22} \cdot G^{\frac{1}{\gamma}} + A_{23} \cdot B^{\frac{1}{\gamma}}}{A_{11} \cdot R^{\frac{1}{\gamma}} + A_{12} \cdot G^{\frac{1}{\gamma}} + A_{13} \cdot B^{\frac{1}{\gamma}}} \quad \text{(eq. 11)}$$

$$V_{post3} = \frac{A_{31} \cdot R^{\frac{1}{\gamma}} + A_{32} \cdot G^{\frac{1}{\gamma}} + A_{33} \cdot B^{\frac{1}{\gamma}}}{A_{11} \cdot R^{\frac{1}{\gamma}} + A_{12} \cdot G^{\frac{1}{\gamma}} + A_{13} \cdot B^{\frac{1}{\gamma}}}$$

As a reminder:
When in BT.2020 color gamut, $$A = \begin{bmatrix} A_1 \\ A_2 \\ A_3 \end{bmatrix} = \begin{bmatrix} A_{11} & A_{12} & A_{13} \\ A_{21} & A_{22} & A_{23} \\ A_{31} & A_{22} & A_{33} \end{bmatrix} = \begin{bmatrix} 0.2627 & 0.678 & 0.0593 \\ -0.13963 & -0.36037 & 0.5 \\ 0.5 & -0459786 & -0.040214 \end{bmatrix}$$

When in BT.709 color gamut, $$A = \begin{bmatrix} A_1 \\ A_2 \\ A_3 \end{bmatrix} = \begin{bmatrix} A_{11} & A_{12} & A_{13} \\ A_{21} & A_{22} & A_{23} \\ A_{31} & A_{22} & A_{33} \end{bmatrix} = \begin{bmatrix} 0.2126 & 0.7152 & 0.0722 \\ -0.114572 & -0.385428 & 0.5 \\ 0.5 & 0454153 & -0.045847 \end{bmatrix}$$

This means the pre-processor can evaluate the intermediate chroma component $U_{post3}$ and $V_{post3}$ based on the input RGB components. Consequently, depending on the post-processor module integer implementation, the pre-processor can determine when the intermediate chroma component $U_{post2}$ and $V_{post2}$ values risk to be clipped.

Taking the example of the integer implementation of the post-processor module in SL-HDR1 mode using a bit-length of 14 bits+1 bit for sign for an internal representation of chroma components $U_{post2}$ and $V_{post2}$ and a bit-length of 9 bits+1 bit for sign for a representation of the chroma components $U_{post3}$ and $V_{post3}$, a maximum chroma component value $U_{max}$ (respectively $V_{max}$) that can be taken by $U_{post3}$ (respectively $V_{post3}$) equals to "$2^9-1=511$". All absolute values of component $U_{post2}$ (respectively $V_{post2}$) greater than "511" are clipped to "511" when converted to 9 bits+1 bit for sign to compute components $U_{post3}$ and $V_{post3}$.

In the process of FIG. 4, equation (eq. 11) is used in step 401 to emulate the post-processor module to obtain $U_{post3}$ and $V_{post3}$.

Clipping Prevention Condition for SL-HDR1 Mode

A first goal of the present application is to prevent clipping on the post-processing process side. Knowing the maximum chroma components values $U_{max}$ and $V_{max}$, a modification of the source RGB components in equation (eq 11) allows obtaining components $U_{post3}$ and $V_{post3}$ values lower than or equal to $U_{max}$ and $V_{max}$, leading to:

$$U_{post3} = \frac{A_{21} \cdot R_m^{\frac{1}{\gamma}} + A_{22} \cdot G_m^{\frac{1}{\gamma}} + A_{23} \cdot B_m^{\frac{1}{\gamma}}}{A_{11} \cdot R_m^{\frac{1}{\gamma}} + A_{12} \cdot G_m^{\frac{1}{\gamma}} + A_{13} \cdot B_m^{\frac{1}{\gamma}}} \leq U_{max} \quad \text{(eq. 12)}$$

$$V_{post3} = \frac{A_{31} \cdot R_m^{\frac{1}{\gamma}} + A_{32} \cdot G_m^{\frac{1}{\gamma}} + A_{33} \cdot B_m^{\frac{1}{\gamma}}}{A_{11} \cdot R_m^{\frac{1}{\gamma}} + A_{12} \cdot G_m^{\frac{1}{\gamma}} + A_{13} \cdot B_m^{\frac{1}{\gamma}}} \leq V_{max}$$

With $R_mG_mB_m$ the modified RGB components of a current sample.

For a given sample, either:

there is no clipping, i.e. $U_{post3} \leq U_{max}$ and $V_{post3} \leq V_{max}$. Therefore, no modification is needed;

there is a clipping on $U_{post3}$, i.e. $U_{post3} > U_{max}$. Therefore, RGB modification is needed to respect a condition C1, represented by equation (eq 13) below:

$$U_{post3} = \frac{A_{21} \cdot R_m^{\frac{1}{\gamma}} + A_{22} \cdot G_m^{\frac{1}{\gamma}} + A_{23} \cdot B_m^{\frac{1}{\gamma}}}{A_{11} \cdot R_m^{\frac{1}{\gamma}} + A_{12} \cdot G_m^{\frac{1}{\gamma}} + A_{13} \cdot B_m^{\frac{1}{\gamma}}} = U_{max} \quad \text{(eq. 13)}$$

There is a clipping on $V_{post3}$, i.e. $V_{post3} > V_{max}$. Therefore, a modification is needed to respect a condition C2 represented by equation (eq 14) below:

$$V_{post3} = \frac{A_{31} \cdot R_m^{\frac{1}{\gamma}} + A_{32} \cdot G_m^{\frac{1}{\gamma}} + A_{33} \cdot B_m^{\frac{1}{\gamma}}}{A_{11} \cdot R_m^{\frac{1}{\gamma}} + A_{12} \cdot G_m^{\frac{1}{\gamma}} + A_{13} \cdot B_m^{\frac{1}{\gamma}}} = V_{max} \quad \text{(eq. 14)}$$

Hue Preservation Condition for SL-HDR1 Mode

A second goal of the present disclosure is to preserve the hue of the modified samples. In a YUV representation, a hue H is computed as H=arctan (V/U)=arctan ($V_{post3}/U_{post3}$).

Let $R_sG_sB_s$ being the RGB source components (before modification by the process of FIG. 4) of the current sample and $R_mG_mB_m$ the modified RGB components of the current sample (outputted by the process of FIG. 4). Let $H_s$ being the hue of the current sample before modification (from $R_sG_sB_s$ components) and $H_m$ being the hue of the current sample after modification (from $R_mG_mB_m$ components).

Preserving the hue therefore means that $H_s=H_m$, which is equivalent to respect a condition C3 represented by (eq. 15) below:

$$\frac{A_{31} \cdot R_m^{\frac{1}{\gamma}} + A_{32} \cdot G_m^{\frac{1}{\gamma}} + A_{33} \cdot B_m^{\frac{1}{\gamma}}}{A_{11} \cdot R_m^{\frac{1}{\gamma}} + A_{12} \cdot G_m^{\frac{1}{\gamma}} + A_{13} \cdot B_m^{\frac{1}{\gamma}}} = \frac{V_{post3}}{U_{post3}} = \tan(H_s) = \tan(H_m) = \tan(H) = tH \quad \text{(eq. 15)}$$

Main Component Preservation Condition for SL-HDR1 Mode

As described earlier, the U chroma component is mainly related to the B (blue) component and the V chroma component is mainly related to the R (red) component. When computing the $R_mG_mB_m$ components of the current sample, we want to preserve as much as possible the color of the current sample and therefore we want to preserve as much as possible the value of the B component (when $U_{post3}$ is clipped) or of the R component (when $V_{post3}$ is clipped). Therefore, in the following, additional conditions C4 and C5 are defined below that controls the value of the modified $R_m$ or $B_m$ components:

When $U_{post3}$ is clipping, $$B_m^{\frac{1}{\gamma}} = B_s^{\frac{1}{\gamma}} * \text{B\_factor};$$

When $V_{post3}$ is clipping, $$R_m^{\frac{1}{\gamma}} = R_s^{\frac{1}{\gamma}} * \text{R\_factor}.$$

In the above two equations, a range factor B_factor (resp. R_factor) allows having a corrected value of the corrected component $B_m$ (respectively $R_m$) close to the value of the source component $B_s$ (respectively $R_s$) by fixing a range of admissible values around the value of the source component (respectively $R_s$).

The range factor B_factor (respectively R_factor) can be a fixed value. Alternatively, it can be a value that depends on a peak luminance of the video content or of the current picture.

The range factor B_factor and R_factor may be equal or have different values.

In a specific implementation, we chose for example B_factor=R_factor=0.95.

Optionally we can limit the value of the $R_m$ or $B_m$ value to an upper bound as follows:

$$R_m(resp.B_m) < \text{Max\_RGB\_value}$$

In a specific implementation, for example, Max_RGB_value=2000.

In a specific implementation the condition C4 is represented for example by equation (eq. 16) below:

When $U_{post3}$ is clipped:

$$B_m^{\frac{1}{\gamma}} = \text{MIN}\left(B_s^{\frac{1}{\gamma}} * \text{B\_factor}, \text{Max\_RGB\_value}^{\frac{1}{\gamma}}\right) \quad \text{(eq. 16)}$$

In a specific implementation the condition C5 is represented for example by equation (eq. 17) below:

When $V_{post3}$ is clipping:

$$R_m^{\frac{1}{\gamma}} = \text{MIN}\left(R_s^{\frac{1}{\gamma}} * \text{R\_factor}, \text{Max\_RGB\_value}^{\frac{1}{\gamma}}\right) \quad \text{(eq. 17)}$$

FIGS. 5 and 6 represent two examples of correction processes allowing respecting the clipping prevention condition, the hue preservation condition and the main component preservation condition.

FIG. 5 is an example of a first correction process adapted to the case where the first intermediate chroma component is $U_{post3}$.

The first correction process of FIG. 5 is executed by the processing module 70 of the pre-processing module 11 during step 403.

In a step 4031, the processing module 70 computes $$B_m^{\frac{1}{\gamma}}$$

using equation (eq. 16) to respect condition C4.

In a step 4032, the processing module 70 computes the value $$G_m^{1/\gamma}$$

as follows:

Using equation (eq 13) (condition C1) to extract $$R_m^{\frac{1}{\gamma}}$$

value leads to equation (eq 18):

$$R_m^{\frac{1}{\gamma}} = \frac{G_m^{\frac{1}{\gamma}} \cdot (U_{max} \cdot A_{12} - A_{22}) + B_m^{\frac{1}{\gamma}} \cdot (U_{max} \cdot A_{13} - A_{23})}{A_{21} - U_{max} \cdot A_{11}} \quad \text{(eq. 18)}$$

Using equation (eq. 15) (condition C3) to extract $$R_m^{\frac{1}{\gamma}}$$

value leads to equation (eq 19):

$$R_m^{\frac{1}{\gamma}} = \frac{G_m^{\frac{1}{\gamma}} \cdot (tH \cdot A_{22} - A_{32}) + B_m^{\frac{1}{\gamma}} \cdot (tH \cdot A_{23} - A_{33})}{A_{31} - tH \cdot A_{21}} \quad \text{(eq. 19)}$$

Combining equations (eq 18) and (eq 19) leads to equation (eq 20) allowing computing $$G_m^{\frac{1}{\gamma}}$$

$$G_m^{\frac{1}{\gamma}} = B_m^{\frac{1}{\gamma}} \cdot \frac{U_{max} \cdot (A_{11} \cdot A_{33} - A_{13} \cdot A_{31}) + A_{23} \cdot A_{31} - A_{21} \cdot A_{33} + U_{max} \cdot tH \cdot (A_{13} \cdot A_{21} - A_{11} \cdot A_{23})}{A_{21} \cdot A_{32} - A_{22} \cdot A_{31} + U_{max} \cdot (A_{12} \cdot A_{31} - A_{11} \cdot A_{32})} \quad \text{(eq. 20)}$$

In a step 4033, the processing module 70 computes the value $$R_m^{1/\gamma}$$

using equations (eq. 18) or (eq. 19).

In a step 4034, the processing module 70 computes the modified RGB components $R_m$, $G_m$ and $B_m$ as follows $$R_m = \left(R_m^{\frac{1}{\gamma}}\right)^{\gamma}; \; G_m = \left(G_m^{\frac{1}{\gamma}}\right)^{\gamma}; \; B_m = \left(B_m^{\frac{1}{\gamma}}\right)^{\gamma}.$$

In a step 4035, the modified RGB components $R_m$, $G_m$ and $B_m$ replace the source components $R_s$, $G_s$ and $B_s$ for the current sample and are used as input of step 110.

FIG. 6 is an example of a second correction process adapted to the case where the second intermediate chroma component is $V_{post3}$.

The second correction process of FIG. 6 is executed by the processing module 70 of the pre-processing module 11 during step 405.

In a step 4051, the processing module 70 computes $$R_m^{\frac{1}{\gamma}}$$

using equation (eq. 17) to respect condition C5.

In a step 4052, the processing module 70 computes the value $$G_m^{1/\gamma}$$

as follows:

Using equation (eq 14) (condition C2) to extract $$B_m^{\frac{1}{\gamma}}$$

value leads to equation (eq 21):

$$B_m^{\frac{1}{\gamma}} = \frac{G_m^{\frac{1}{\gamma}} \cdot (U_{max} \cdot A_{12} - A_{32}) + R_m^{\frac{1}{\gamma}} \cdot (U_{max} \cdot A_{11} - A_{31})}{A_{33} - U_{max} \cdot A_{13}} \quad \text{(eq. 21)}$$

Using equation (eq. 15) (condition C3) to extract $$B_m^{\frac{1}{\gamma}}$$

value leads to equation (eq 22):

$$B_m^{\frac{1}{\gamma}} = \frac{G_m^{\frac{1}{\gamma}} \cdot (tH \cdot A_{22} - A_{32}) + R_m^{\frac{1}{\gamma}} \cdot (t \cdot HA_{21} - A_{31})}{A_{33} - tH \cdot A_{23}} \quad \text{(eq. 22)}$$

Combining equations (eq 21) and (eq 22) leads to equation (eq 23) allowing computing $$G_m^{\frac{1}{\gamma}}:$$

$$G_m^{\frac{1}{\gamma}} = R_m^{\frac{1}{\gamma}} \cdot \frac{U_{max} \cdot (A_{13} \cdot A_{31} - A_{11} \cdot A_{33}) + tH \cdot (A_{21} \cdot A_{33} - A_{23} \cdot A_{31} + U_{max} \cdot (A_{11} \cdot A_{23} - A_{13} \cdot A_{21}))}{tH \cdot (A_{23} \cdot A_{32} - A_{22} \cdot A_{33} + U_{max} \cdot (A_{13} \cdot A_{22} - A_{12} \cdot A_{23}))} \quad \text{(eq. 23)}$$

In a step 4053, the processing module 70 computes the value $$B_m^{1/\gamma}$$

using equations (eq. 21) or (eq. 22).

In a step 4054, the processing module 70 computes the modified RGB values $R_m$, $G_m$ and $B_m$ as follows $$R_m = \left(R_m^{\frac{1}{\gamma}}\right)^{\gamma};\ G_m = \left(G_m^{\frac{1}{\gamma}}\right)^{\gamma};\ B_m = \left(B_m^{\frac{1}{\gamma}}\right)^{\gamma}.$$

In a step 4055, the modified RGB components $R_m$, $G_m$ and $B_m$ replace the source components $R_s$, $G_s$ and $B_s$ for the current sample and are used as input of step 110.

In the case of SL-HDR2 (and SL-HDR3), the SL-HDR2 preprocessor needs to emulate the post-processing reconstruction process up to the intermediate chroma components $U_{post3}$ and $V_{post3}$ reconstruction, and as $U_{post3}=U_{post2}$ and $V_{post3}=V_{post2}$, this leads to $$\begin{bmatrix} U_{post3} \\ V_{post3} \end{bmatrix} = lucCC\,[Y_{post2}] \cdot \begin{bmatrix} U_{post1} \\ V_{post1} \end{bmatrix} \cdot \frac{maxCoeff}{m_3} = lucCC\,[Y_{pre0}] \cdot \begin{bmatrix} U_{pre0} \\ V_{pre0} \end{bmatrix} \cdot \frac{maxCoeff}{m_3} \quad \text{(eq. 24)}$$

where maxcoeff and $m_3$ are defined in section 7.2.4 of document ETSI TS 103 433-2 v1.3.1 (High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)). lucCC[ ] is defined in section 7.2.3.2 of document ETSI TS 103 433-2 v1.3.1:

$$lutCC\,[0] = 0.125 \quad \text{(eq. A)}$$

$$lutCC\,[Y] = \mathrm{Min}\left(lutCC\,[0];\ \frac{1 + c\,(L_{HDR}; L_{SDR}; L_{pdisp}) \times Y_n^{2.4}}{Y_n \times \mathrm{Max}\,(R_{sgf} \div 255; R_{sgf} \times g(Y_n))} \times \frac{1}{maxSampleVal - 1}\right) \quad \text{(eq. B)}$$

where:

$$Y_n = \frac{Y}{maxSampleVal - 1}$$

a saturation gain function $f_{sgf}$ is derived from piece-wise linear pivot points defined by variables saturationGainX[i], for i=0 to saturationGainNumVal-1. When saturationGainNumVal is equa to 0, $f_{sgf}(\ )=1+R_{sgf}$(with $R_{sgf}=2$).

$$g(Y_n) = f_{sgf}(Y_n) \times modFactor \div (1 - modFactor) \div R_{sgf}$$

where:

modFactor=0 if the $L_{pdisp}$ equals $L_{HDR}$;

modFactor=1 if the $L_{pdisp}$ equals $L_{SDR}$; and, modFactor=c ($L_{HIDR}$; $L_{SDR}$; $L_{pdisp}$);

c($L_{HIDR}$; $L_{SDR}$; $L_{pdisp}$) is a color correction function that shall be derived as follows:

$$c(L_{HDR}; L_{SDR}; L_{pdisp}) = 1 - \frac{invPQ\,(L_{pdisp}) - invPQ\,(L_{SDR})}{invPQ\,(L_{HDR}) - invPQ\,(L_{SDR})} \quad \text{(eq. C)}$$

As the reconstruction must be identical to the source, let us consider that there is no display adaptation, i.e. $L_{pdisp}=L_{HDR}$, leading to c=0 and $g(Y_n)=1/R_s$ gf, equation (eq. B) can then be simplified to:

$$lutCC\,[Y_{post2}] = lutCC\,[Y_{pre0}] = \frac{1}{Y_{pre0}} \quad \text{(eq. 25)}$$

Combining equations (eq. 24) and (eq. 25), one obtains:

$$\begin{bmatrix} U_{post3} \\ V_{post3} \end{bmatrix} = \frac{1}{Y_{pre0}} \cdot \begin{bmatrix} U_{pre0} \\ V_{pre0} \end{bmatrix} \cdot \frac{maxCoeff}{m3} \quad \text{(eq. 26)}$$

Combining equation (eq. 26) with equation (eq. 7) and with $$corr = \frac{maxCoeff}{m_3},$$

one obtains:

$$U_{post3\_c} = \frac{U_{post3}}{corr} = \frac{A_{21} \cdot R'' + A_{22} \cdot G'' + A_{23} \cdot B''}{A_{11} \cdot R'' + A_{12} \cdot G'' + A_{13} \cdot B''} \le U_{max\_c} = \frac{U_{max}}{corr} \quad \text{(eq. 27)}$$

$$V_{post3\_c} = \frac{V_{post3}}{corr} = \frac{A_{31} \cdot R'' + A_{32} \cdot G'' + A_{33} \cdot B''}{A_{11} \cdot R'' + A_{12} \cdot G'' + A_{13} \cdot B''} \le V_{max\_c} = \frac{V_{max}}{corr}$$

In SL-HDR2 (and SL-HDR3), the principle of respecting simultaneously the clipping prevention condition, the hue preservation condition and the main component preservation condition is similar to the SL-HDR1 case described above.

Clipping Prevention Condition for SL-HDR2

For a current sample, either:

There is no clipping, i.e. $U_{post3\_c} \le U_{max\_c}$ and $V_{post3\_c} \le V_{max\_c}$. Therefore, no modification is needed.

There is a clipping on $U_{post3\_c}$, i.e. $U_{post3\_c} > U_{max\_c}$. Therefore, a modification is needed to respect a condition C1' represented by equation (eq. 28)

$$U_{post3\_c} = \frac{A_{21} \cdot R''_m + A_{22} \cdot G''_m + A_{23} \cdot B''_m}{A_{11} \cdot R''_m + A_{12} \cdot G''_m + A_{13} \cdot B''_m} = U_{max\_c} \quad \text{(eq. 28)}$$

There is a clipping on $V_{post3\_c}$, i.e. $V_{post3} > V_{max}$. Therefore, a modification is needed to respect a condition C2' represented by equation (eq. 29)

$$V_{post3\_c} = \frac{A_{31} \cdot R''_m + A_{32} \cdot G''_m + A_{33} \cdot B''_m}{A_{11} \cdot R''_m + A_{12} \cdot G''_m + A_{13} \cdot B''_m} = V_{max\_c} \quad \text{(eq. 29)}$$

Hue Preservation Condition for SL-HDR2

Preserving the hue means that $H_s = H_m$, equivalent to a condition C3' represented by equation (eq. 30):

$$\frac{A_{31} \cdot R''_m + A_{32} \cdot G''_m + A_{33} \cdot B''_m}{A_{21} \cdot R''_m + A_{22} \cdot G''_m + A_{23} \cdot B''_m} = \frac{V_{post3\_c}}{U_{post3\_c}} = \tan(H) = tH \quad \text{(eq. 30)}$$

Main Component Preservation Condition for SL-HDR2

In a specific implementation the condition is:

When $U_{post3\_c}$ is clipped, condition C4' represented by equation (eq 31) applies:

$$B''_m = \text{MIN}(B''_s * \text{B\_factor}, \text{Max\_RGB\_value}'') \quad \text{(eq. 31)}$$

When $V_{post3\_c}$ is clipping, condition C5' represented by equation (eq 32) applies:

$$R''_m = \text{MIN}(R''_s * \text{R\_factor}, \text{Max\_RGB\_value}'') \quad \text{(eq. 32)}$$

The pre-processing process allowing limiting the risk of clipping at the post-processing process level of FIG. 4 applies in the case of SL-HDR2 (and Sl-HDR3) with the following modifications:

in step 402, $U_{post3}$ is replaced by $U_{post3\_c}$ and $U_{max}$ is replaced by $U_{max\_c}$;

in step 404, $V_{post3}$ is replaced by $V_{post3\_c}$ and $V_{max}$ is replaced by $V_{max\_c}$;

In step 4031, the processing module 70 computes $B_m'$ using equation (eq. 31) to respect condition C4'.

In step 4032, the processing module 70 computes the value $G_m'$ as follows:

Using equation (eq 27) (condition C1') to extract $R_m'$ value leads to equation (eq. 33):

$$R''_m = \frac{G''_m \cdot (U_{max\_c} \cdot A_{12} - A_{22}) + B''_m \cdot (U_{max\_c} \cdot A_{13} - A_{23})}{A_{21} - U_{max\_c} \cdot A_{11}} \quad \text{(eq. 33)}$$

Using equation (eq. 29) (condition C3) to extract $R_m'$ value leads to equation (eq. 34):

$$R''_m = \frac{G''_m \cdot (tH \cdot A_{22} - A_{32}) + B''_m \cdot (tH \cdot A_{23} - A_{33})}{A_{31} - tH \cdot A_{21}} \quad \text{(eq. 34)}$$

Combining equations (eq. 33) and (eq. 34) leads to equation (eq 35) allowing computing $G_m'$:

$$G''_m = B''_m \cdot \frac{U_{max\_c} \cdot (A_{11} \cdot A_{33} - A_{13} \cdot A_{31}) + A_{23} \cdot A_{31} - A_{21} \cdot A_{33} + U_{max\_c} \cdot tH \cdot (A_{13} \cdot A_{21} - A_{11} \cdot A_{23})}{A_{21} \cdot A_{32} - A_{22} \cdot A_{31} + U_{max\_c} \cdot (A_{12} \cdot A_{31} - A_{11} \cdot A_{32})} \quad \text{(eq. 35)}$$

In step 4033, the processing module 70 computes the value $R_m'$ using equations (eq. 33) or (eq. 34).

In step 4034, the processing module 70 computes the modified RGB components $R_m$, $G_m$ and $B_m$ as follows $R_m$=inv_PQ_OETF ($R_m'$); $G_m$=inv_PQ_OETF($G_m'$); $B_m$=inv_PQ_OETF ($B_m'$).

In step 4051, the processing module 70 computes $B_m'$ using equation (eq. 31) to respect condition C5'.

In step 4052, the processing module 70 computes the value $G_m'$ follows:

as

Using equation (eq 29) (condition C2') to extract $B_m'$ value leads to equation (eq 36):

$$B''_m = \frac{G''_m \cdot (U_{max\_c} \cdot A_{12} - A_{32}) + R''_m \cdot (U_{max\_c} \cdot A_{11} - A_{31})}{A_{33} - U_{max\_c} \cdot A_{13}} \quad \text{(eq. 36)}$$

Using equation (eq. 30) (condition C3') to extract $$B_m^{\frac{1}{\gamma}}$$

value leads to equation (eq. 37):

$$B''_m = \frac{G''_m \cdot (tH \cdot A_{22} - A_{32}) + R''_m \cdot (tH \cdot A_{21} - A_{31})}{A_{33} - tH \cdot A_{23}} \quad \text{(eq. 37)}$$

Combining equations (eq. 36) and (eq. 37) leads to equation (eq. 38) allowing computing $G_m'$:

$$G''_m = R''_m \cdot \frac{U_{max\_c} \cdot (A_{13} \cdot A_{31} - A_{11} \cdot A_{33}) + H \cdot (A_{21} \cdot A_{33} - A_{23} \cdot A_{31} + U_{max\_c} \cdot (A_{11} \cdot A_{23} - A_{13} \cdot A_{21}))}{tH \cdot (A_{23} \cdot A_{32} - A_{22} \cdot A_{33} + U_{max\_c} \cdot (A_{13} \cdot A_{22} - A_{12} \cdot A_{23}))} \quad \text{(eq. 38)}$$

In step 4053, the processing module 70 computes the value $B_m'$ using equations (eq. 36) or (eq. 37).

In a step 4054, the processing module 70 computes the modified RGB components $R_m$, $G_m$ and $B_m$ as follows $R_m$=inv_PQ_OETF ($R_m'$); $G_m$=inv_PQ_OETF($G_m'$); $B_m$=inv_PQ_OETF ($B_m'$).

One can note that the correction processes of FIGS. 5 and 6 allow obtaining samples of a current picture inputted to the pre-processing process respecting the clipping prevention condition, the Hue preservation condition and the main component preservation condition.

In an embodiment, the correction processes correct the samples of the current picture inputted to the pre-processing process so that these samples respect only the clipping prevention condition.

In another embodiment, the correction processes correct the samples of the current picture inputted to the pre-processing process so that these samples respect the the clipping prevention condition and one of the hue preservation condition and the main component preservation condition.

We described above a number of embodiments. Features of these embodiments can be provided alone or in any combination. Further, embodiments can include one or more of the following features, devices, or aspects, alone or in any combination, across various claim categories and types:

A bitstream or signal that includes a corrected video content, or variations thereof.

Creating and/or transmitting and/or receiving and/or decoding a bitstream or signal that includes a corrected video content, or variations thereof.

A server, camera, TV, set-top box, cell phone, tablet, personal computer or other electronic device that performs at least one of the embodiments described.

A server, camera, cell phone, tablet, personal computer or other electronic device that tunes (e.g. using a tuner) a channel to transmit a signal including a corrected video content and SL-HDR1 mode, SL-HDR2 or SL-HDR3 metadata, and performs at least one of the embodiments described.

A server, camera, cell phone, tablet, personal computer or other electronic device that transmits (e.g. using an antenna) a signal over the air that includes a corrected video content and SL-HDR1 mode, SL-HDR2 or SL-HDR3 metadata, and performs at least one of the embodiments described.

The invention claimed is:

1. A method comprising:

emulating an implementation of a post-processing process using input color components of a current sample of a current picture up to a computation of at least one intermediate chroma component, the post-processing process being comprised in a process for generating a picture in a first dynamic range from a picture in a second dynamic range and metadata representative of tone mapping parameters and color correction parameters;

determining that a value of the at least one intermediate chroma component is higher than a maximum chroma component value depending on a calculation precision set in the implementation of the post-processing process;

applying a correction process on the input color components to obtain corrected color components for the current sample respecting at least a clipping prevention condition and a hue preservation condition responsive to the value of the at least one intermediate chroma component is higher than the maximum chroma component value, the hue preservation condition allows obtaining a hue for the corrected color components in a range of admissible values around the hue of the input color components, the clipping prevention condition allows obtaining an intermediate chroma component value from a modified input color component lower than or equal to the maximum chroma component value;

replacing the input color components of the current sample by the corrected color components; and, generating a picture representative of the current picture in the second dynamic range and the metadata wherein the generating comprises applying a pre-processing process on the current sample.

2. The method of claim 1 wherein the correction process modifies the input color components to obtain corrected color components for the current sample respecting in addition a main component preservation condition, the main component preservation condition defines a range of admissible values for a corrected color component corresponding to the at least one intermediate chroma component higher than the maximum chroma component value around the value of an input color component corresponding to the same at least one intermediate chroma component higher than the maximum chroma component value.

3. The method of claim 1 wherein the hue preservation condition is respected when a ratio between an intermediate chroma component of a first chroma type and an intermediate chroma component of a second chroma type obtained from the corrected color components is equal to a ratio between an intermediate chroma component of a first chroma type and an intermediate chroma component of a second chroma type obtained from the input color components.

4. The method of claim 2 wherein the range depends on a range factor, the range factor being fixed or depend on a peak luminance of a video content comprising the current picture or of the current picture.

5. The method of claim 4 wherein the range factor is the same for all intermediate chroma components or different for each intermediate chroma component.

6. A device comprising electronic circuitry configured for:

emulating an implementation of a post-processing process using input color components of a current sample of a current picture up to a computation of at least one intermediate chroma component, the post-processing process being comprised in a process for generating a picture in a first dynamic range from a picture in a second dynamic range and metadata representative of tone mapping parameters and color correction parameters;

determining that a value of the at least one intermediate chroma component is higher than a maximum chroma component value depending on a calculation precision set in the implementation of the post-processing process;

applying a correction process on the input color components to obtain corrected color components for the current sample respecting at least a clipping prevention condition and a hue preservation condition responsive to the value of the at least one intermediate chroma component is higher than the maximum chroma component value, the hue preservation condition allows obtaining a hue for the corrected color components in a range of admissible values around the hue of the input color components, the clipping prevention condition allows obtaining an intermediate chroma component value from a modified input color component lower than or equal to the maximum chroma component value;

replacing the input color components of the current sample by the corrected color components; and, generating a picture representative of the current picture in the second dynamic range and the metadata wherein the generating comprises applying a pre-processing process on the current sample.

7. The device of claim 6 wherein the correction process modifies the input color components to obtain corrected color components for the current sample respecting in addition a main component preservation condition, the main component preservation condition defines a range of admissible values for a corrected color component corresponding to the at least one intermediate chroma component higher than the maximum chroma component value around the value of an input color component corresponding to the same at least one intermediate chroma component higher than the maximum chroma component value.

8. The device of claim 6 wherein the hue preservation condition is respected when a ratio between an intermediate chroma component of a first chroma type and an intermediate chroma component of a second chroma type obtained from the corrected color components is equal to a ratio between an intermediate chroma component of the first chroma type and an intermediate chroma component of the second chroma type obtained from the input color components.

9. The device of claim 7 wherein the range depends on a range factor, the range factor being fixed or depend on a peak luminance of a video content comprising the current picture or depending on the current picture.

10. The device of claim 9 wherein the range factor is the same for all intermediate chroma components or different for each intermediate chroma component.

11. Non-transitory information storage medium storing program code instructions for implementing the method according to claim 1.

12. The method of claim 2 wherein the hue preservation condition is respected when a ratio between an intermediate chroma component of a first chroma type and an intermediate chroma component of a second chroma type obtained from the corrected color components is equal to a ratio between an intermediate chroma component of a first chroma type and an intermediate chroma component of a second chroma type obtained from the input color components.

13. The method of claim 12 wherein the range depends on a range factor, the range factor being fixed or depend on a peak luminance of a video content comprising the current picture or of the current picture.

14. The method of claim 13 wherein the range factor is the same for all intermediate chroma components or different for each intermediate chroma component.

15. The device of claim 7 wherein the hue preservation condition is respected when a ratio between an intermediate chroma component of a first chroma type and an intermediate chroma component of a second chroma type obtained from the corrected color components is equal to a ratio between an intermediate chroma component of the first chroma type and an intermediate chroma component of the second chroma type obtained from the input color components.

16. The device of claim 15 wherein the range depends on a range factor, the range factor being fixed or depend on a peak luminance of a video content comprising the current picture or depending on the current picture.

17. The device of claim 16 wherein the range factor is the same for all intermediate chroma components or different for each intermediate chroma component.

* * * * *